US012194458B2

(12) United States Patent
Shamayev et al.

(10) Patent No.: US 12,194,458 B2
(45) Date of Patent: Jan. 14, 2025

(54) DEVICE AND METHOD OF PORTABLE DRUG TESTING

(71) Applicant: Nicole Shamayev, Brooklyn, NY (US)

(72) Inventors: Nicole Shamayev, Brooklyn, NY (US); David Otto Madrigal, Astoria, NY (US)

(73) Assignee: Nicole Shamayev, Brooklyn, NY (US)

( * ) Notice: Subject to any disclaimer, the term of this patent is extended or adjusted under 35 U.S.C. 154(b) by 0 days.

(21) Appl. No.: 18/450,188

(22) Filed: Aug. 15, 2023

(65) Prior Publication Data

US 2024/0058809 A1 Feb. 22, 2024

Related U.S. Application Data

(60) Provisional application No. 63/398,282, filed on Aug. 16, 2022.

(51) Int. Cl.
*B01L 3/00* (2006.01)

(52) U.S. Cl.
CPC ....... *B01L 3/5023* (2013.01); *B01L 2300/044* (2013.01); *B01L 2300/069* (2013.01); *B01L 2300/0825* (2013.01)

(58) Field of Classification Search
CPC ............. B01L 3/5023; B01L 2300/044; B01L 2300/069; B01L 2300/0825
USPC ....................................................... 435/287.7
See application file for complete search history.

(56) References Cited

U.S. PATENT DOCUMENTS 4,943,522 A 7/1990 Eisinger et al.
7,090,803 B1 8/2006 Gould et al.
7,384,599 B2 6/2008 Brewer
9,360,398 B2 6/2016 Gold et al.
2004/0202572 A1 10/2004 Glattstein et al.
2006/0040406 A1 2/2006 Schneider et al.
2015/0346105 A1* 12/2015 Gutsell ..................... B01L 7/52 435/287.2

(Continued)

FOREIGN PATENT DOCUMENTS

WO WO-2011039198 A2 * 4/2011 ............... C12Q 1/04

OTHER PUBLICATIONS

PCT Application No. PCT/US23/30326—International Search Report and Written Opinion dated Dec. 7, 2023.

*Primary Examiner* — Jill A Warden
*Assistant Examiner* — Jacqueline Brazin
(74) *Attorney, Agent, or Firm* — Kane Kessler, P.C.; Barry E. Negrin

(57) ABSTRACT

A portable, self-contained drug test kit for testing for the presence or absence of a drug has a housing having a hollow portion with a liquid solvent accessible from outside to enable introduction of a test solute therein. A lateral flow test strip is in user-selective fluid communication with the liquid solvent in the hollow portion. The lateral flow test strip is selectively moveable from a first position in which the lateral flow test strip is not in fluid communication with the liquid solvent in the hollow portion to a second position in which it is in fluid communication with the liquid solvent. When the lateral flow test strip is moved into the second position and the test solute is introduced into the hollow portion, the liquid solvent mixes with the test solute to form a test solution and thereby activate the lateral flow test strip.

8 Claims, 10 Drawing Sheets

(56) References Cited

U.S. PATENT DOCUMENTS

| | | | | |
|---|---|---|---|---|
| 2016/0106671 | A1* | 4/2016 | Brinker | A61K 31/711<br>424/238.1 |
| 2021/0164910 | A1 | 6/2021 | Jones et al. | |
| 2022/0244259 | A1* | 8/2022 | Johnson | G01N 33/54388 |
| 2022/0299509 | A1* | 9/2022 | Dyer | B01L 7/00 |

* cited by examiner

DEVICE AND METHOD OF PORTABLE DRUG TESTING

RELATED APPLICATIONS

Priority is claimed from U.S. Provisional Patent Application No. 63/398,282 filed Aug. 16, 2022 entitled "Pocket Fentanyl Screening Device", the entirety of which is incorporated by reference herein.

BACKGROUND OF THE INVENTION

Field of the Invention

The invention is directed to devices and methods for drug testing, and more specifically to devices and methods of portable, self-contained testing for illicit substances by a consumer or similar layperson/non-professional.

Description of Related Art

The age-adjusted rate of overdose deaths have increased dramatically in recent years with a 31% jump from 2019 to 2020 alone. Synthetic opioids are a driving force in this issue accounting for 61.6% of all drug overdose deaths in 2020. Reports indicate that synthetic opioid-involved deaths are dominated by fentanyl-involved overdose deaths, with the source of the fentanyl being more likely to be illicitly manufactured than pharmaceutical.

There is no visual way to tell whether an illicitly manufactured drug has been laced with fentanyl; the most common identification method is to screen the substance with a lateral flow fentanyl testing strip. The standard procedure for running a fentanyl test strip is first for a user to find a bottle cap and have it filled with water. Then, to dissolve a small amount of drug into the water. The end of the fentanyl test strip then needs to be dipped in the mixture for 15 seconds, removed, and laid on a horizontal surface for 2 minutes. The binary readout on the strip (two red lines for no fentanyl and one red line for confirmed presence) allow the user to know the results from their screen.

The screening process is rather simple. However, the gathering of materials such as a bottle cap and a water source may not be possible in certain chaotic situations that drugs may be taken in (e.g., a party, a concert, camping, etc.). The test strips are also often used improperly: it is possible to dip the test strip too far into the sample, resulting in an invalid test. Finally, running the test in a social setting may not be appealing for a drug user since it is not a discreet process.

Thus, there is a long-felt need for an intuitive and discreet portable and self-contained device and method to perform a drug screening test for a substance such as fentanyl without the need to gather the materials.

SUMMARY OF THE INVENTION

The above and other needs are met by the invention, which is, in one embodiment, a portable, self-contained drug test kit for testing for the presence or absence of a drug. In one embodiment a first housing section has a first hollow portion, and a frangible container at least partially filled with a liquid solvent is disposed in the first hollow portion. A second housing section is matingly engageable with the first housing section in a first configuration to form a pocket-sized portable housing. The second housing section includes a second hollow portion that corresponds to the first hollow portion when the second housing section is matingly engaged to the first housing section in the first configuration to form a reservoir. The second housing section also includes a projection corresponding to the frangible container when the second housing section is matingly engaged to the first housing section in the first configuration. A lateral flow test strip is in communication with one of the first housing section or the second housing section, the lateral flow test strip having a reagent that reacts in the presence of the drug being tested for. When the second housing section is matingly engaged with the first housing section in the first configuration with a test solute disposed in one of the first housing portion or the second housing portion, the projection pierces the frangible container, releasing the liquid solvent to mix with the test solute and thereby activating the lateral flow test strip to test for the presence or absence of the drug in a self-contained manner.

Optionally, the lateral flow test strip is disposed at least partially in one of the first housing section or the second housing section, and the one of the first housing section or the second housing section in which the lateral flow test strip is disposed further includes a window through which at least a portion of the lateral flow test strip can be seen from outside the drug test kit.

The second housing section is preferably additionally matingly engageable with the first housing section in a second configuration in which the projection and the frangible container do not correspond and the projection does not pierce the frangible container. Optionally, the second housing section is substantially planar and includes a first side and a second side, the second hollow portion being formed on the first side; the second housing section is matingly engageable to the first housing section in the first configuration by placing the second housing section against the first housing section with the first side facing the first housing section. Optionally, the second housing section is matingly engageable to the first housing section in the second configuration by placing the second housing section against the first housing section with the second side facing the first housing section. The drug test kit further preferably includes securing structure for securing the second housing section to the first housing section, the securing structure including male fasteners formed on at least one of the first housing section or the second housing section and female fasteners formed in at least the other of the first housing section or the second housing section, the female fasteners corresponding to the male fasteners in at least one of the first configuration or the second configuration. The male fasteners and the female fasteners are optionally arranged in a symmetrical positioning so that the male fasteners engage the female fasteners in both the first configuration and the second configuration. Alternatively, the second housing section snap fits to the first housing section in the first configuration.

Alternatively, the second housing section is slidably attached to the first housing section, wherein the second housing section is matingly engageable to the first housing section in the first configuration by sliding the second housing section along the first housing section from the second configuration to the first configuration.

Alternatively, the second housing section is rotatably attached to the first housing section, wherein the second housing section is matingly engageable to the first housing section in the first configuration by rotating the second housing section with respect to the first housing section from the second configuration to the first configuration.

Preferably, the liquid solvent includes water, and the lateral flow test strip reagent is optionally reactive at least to fentanyl.

In another embodiment, the invention is a portable, self-contained drug test kit for testing for the presence or absence of a drug. It includes a pocket-sized portable housing having a hollow portion at least partially pre-filled with a liquid solvent, the hollow portion being accessible from outside the test kit to enable introduction of a test solute into the hollow portion. A lateral flow test strip is in user-selective fluid communication with the liquid solvent in the hollow portion, the lateral flow test strip having a reagent that reacts in the presence of the drug being tested for. The lateral flow test strip is preferably selectively moveable from a first position in which the lateral flow test strip is not in fluid communication with the liquid solvent in the hollow portion to a second position in which the lateral flow test strip is in fluid communication with the liquid solvent in the hollow portion. When the lateral flow test strip is moved into the second position and the test solute is introduced into the hollow portion, the liquid solvent mixes with the test solute to form a test solution and thereby activate the lateral flow test strip to test for the presence or absence of the drug in a self-contained manner. The liquid solvent preferably includes water, and the lateral flow test strip reagent is preferably reactive at least to fentanyl.

The invention further includes a portable, self-contained method for testing for the presence or absence of a drug, having the following steps. A pocket-sized portable housing is provided having a hollow portion at least partially pre-filled with a liquid solvent, the hollow portion being accessible from outside the test kit to enable introduction of a test solute into the hollow portion. A lateral flow test strip is provided in user-selective fluid communication with the liquid solvent in the hollow portion, the lateral flow test strip having a reagent that reacts in the presence of the drug being tested for. At least one of the lateral flow test strip or a portion of the housing is moved from a first position in which the lateral flow test strip is not in fluid communication with the liquid solvent in the hollow portion to a second position in which the lateral flow test strip is in fluid communication with the liquid solvent in the hollow portion. The test solute is introduced into the hollow portion. The introducing step causes the liquid solvent to mix with the test solute to form a test solution and thereby activate the lateral flow test strip when the at least one of the lateral flow test strip or the portion of the housing is in the second position.

Optionally, the pocket-sized portable housing has a first housing section having a first hollow portion; a frangible container at least partially filled with the liquid solvent disposed in the first hollow portion; and a second housing section matingly engageable with the first housing section in a first configuration that places the lateral flow test strip into the second position, the second housing section having a second hollow portion that corresponds to the first hollow portion when the second housing section is matingly engaged to the first housing section in the first configuration to form a reservoir, and a projection corresponding to the frangible container when the second housing section is matingly engaged to the first housing section in the first configuration. The moving step preferably includes the steps of: matingly engaging the second housing section with the first housing section in the first configuration with a test solute disposed in one of the first housing portion or the second housing portion; piercing the frangible container with the projection; releasing the liquid solvent to mix with the test solute; and activating the lateral flow test strip to test for the presence or absence of the drug in a self-contained manner.

Optionally, the method further includes the step of matingly engaging the second housing section with the first housing section in a second configuration in which the projection and the frangible container do not correspond and the projection does not pierce the frangible container. and the lateral flow test strip is in the first position.

The invention simplifies the current method of screening for substances such as fentanyl in an illicit drug. The current procedure involves the usage of off-the-shelf fentanyl test strips. The test strips screen for the presence of fentanyl by testing an illicit drug in a mixture of water and the drug sample. One end of the strip must be immersed in the mixture; the remaining portion of the strip must remain dry. Once the strip has been dipped vertically into the wet drug mixture, the user must place the strip horizontally for three minutes to allow the chemicals of the strip to diffuse to the region of the strip where the results will be shown. Testing in this manner requires the user to find a cup to fill with clean water, access to the water itself, and a surface to place the strip to allow the chemical process to undergo completion.

By using the invention, the user does not need to obtain the cup or water or surface required by the current procedure. In one embodiment, the pocket-sized portable housing resembles the planar shape of a credit card but is several times as thick. In one embodiment, the invention includes two interlocking parts that snap together. The bottom case includes one or more, e.g., three, columns that act as fasteners. The top part includes one or more, e.g., three, corresponding holes that are designed to fasten with the columns. A press is located in the center of the top part. Each part has an indented/hollow surface on the inside, onto which the user is to sprinkle their drug sample. When the user snaps the two interlocking parts together, both indented surfaces combine to form an enclosed reservoir. A baggie filled with distilled water is glued inside a support stand on the bottom part. The user first sprinkles powdered drug onto either indent or granulates a pill with the square press. When the user snaps the two interlocking parts together, the square press pops the baggie allowing water to fill the reservoir. The user then shakes the device to mix the water and the drug together. A separate portion of the reservoir includes a sponge that is preferably oriented vertically. When the user shakes the invention, the water-drug mixture will contact the sponge through a slit; the sponge will absorb the water-drug mixture and allow diffusion down the sponge. Perpendicularly oriented to the end of the sponge is the fentanyl test strip, with the sponge resting on the end of the strip that must be in contact with liquid.

The invention can be used in any setting, independent of the user's body position; the user can be sitting, standing, or lying down. The invention is designed to fit in a pocket or a backpack-like sack. This is especially useful for high-density settings where illicit drugs are taken such as festivals, clubs, and parties.

In another embodiment, a hatch is located on the top face of the "credit card"-shaped housing. This embodiment lacks the interlocking parts of the main embodiment and uses a complete chamber with an internal water tank. Once the user has opened the hatch, the user sprinkles powdered drug or pours liquid drug into the central water tank. The tank has been pre-filled with a liquid solvent such as distilled water. The user then closes the hatch to prevent spillage of both the water and the drug. The user then shakes the housing to mix the water and the drug together.

In still another embodiment, a track is connected to a test strip case which slides under the water tank. This embodiment lacks the interlocking parts of our main embodiment and instead includes a complete chamber with an internal water tank. Once the user has pushed the strip case entirely into its end position, the water-drug mixture comes into contact with the end of the strip that requires the water-drug mixture. Starting the test requires the user to push the base along the track manually and thus will not trigger if the user shakes the device prematurely.

In still another embodiment, the shape of the device is substantially cylindrical rather than rectangular. (Of course, variations in shape, e.g., triangular, square, hexagonal, and any other shape are also contemplated as being within the scope of the invention.) The water tank is located on the top cylindrical face and has a hatch for inserting a powdered or liquid drug sample. The bottom cylindrical piece containing the test strip remains stationary while the user turns the water tank piece above until the apertures in both tanks line up. Water will drip onto a test strip that is attached to the inside wall of the container, giving the strip a circular shape. The cylindrical pieces may be turned further to block the water from continuing to flow on the test strip. A window on the side of the bottom cylindrical piece reveals the results of the screening and is covered by a see-through material for the user's convenience.

DETAILED DESCRIPTION OF THE INVENTION AND DRAWINGS

Description will now be given with reference to the attached FIGS. 1-14. It should be understood that these figures are exemplary in nature and in no way serve to limit the scope of the invention, which is defined by the claims appearing hereinbelow.

The invention is a single-use portable, self-contained drug test kit for testing for the presence or absence of a drug such as fentanyl. The invention includes of two interlocking half cases combined to form a reservoir for water and drug to mix. One half contains a frangible container such as a water pouch filled with distilled water or other liquid solvent, and the opposite half contains a protruding press or projection. The user sprinkles powdered or liquid drug into the half case with the protruding press, after which they snap the two half cases together. The user shakes the invention to mix the drug with the water. Water-drug mixture will drip through a sponge located inside the reservoir, which allows the water-drug mixture to come in contact with the fentanyl test strip. After a predetermined period of time (e.g., 2-3 minutes, depending upon the test strip utilized), the user looks at the bottom of the half case containing the fentanyl test strip to see the results of the test through a window in the case.

Figure 1:
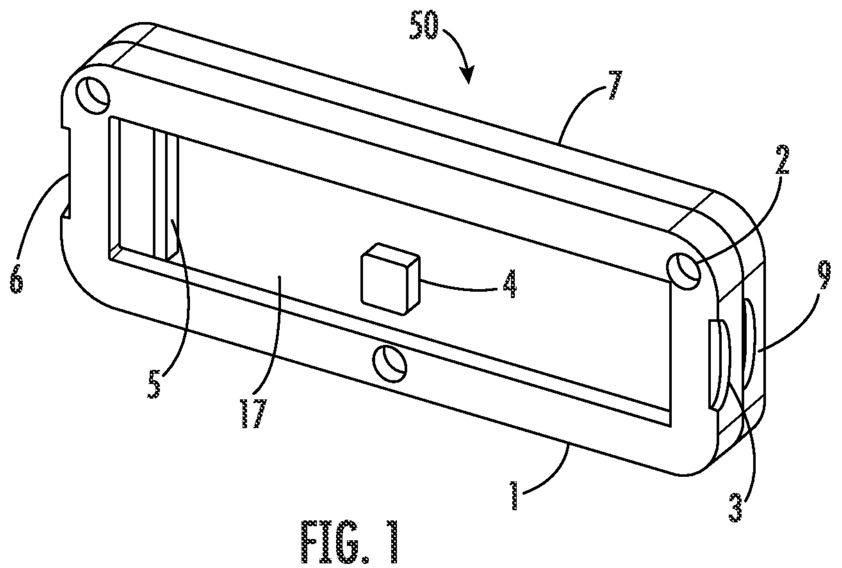
FIG. 1 is a perspective view of a test kit in accordance with an embodiment of the invention how it is distributed to end users. Both case halves 1 and 7 are mated together with the protruding press 4 facing outwards.
Figure 2:
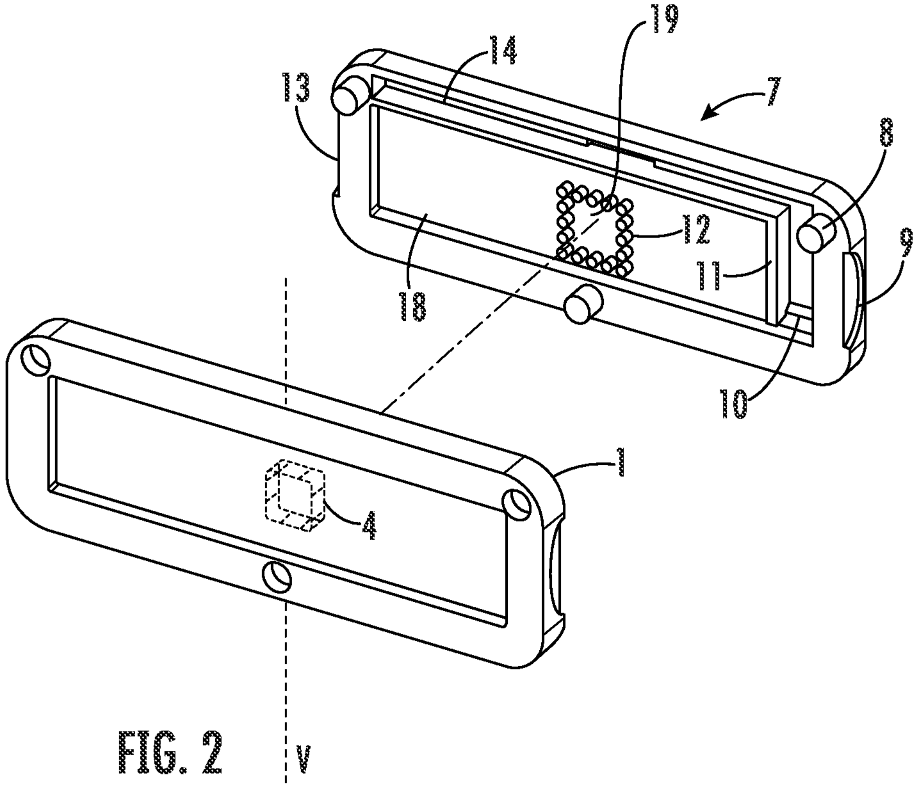
FIG. 2 is a perspective view of a test kit in accordance with an embodiment of the invention being configured for beginning the test. Relative to FIG. 1, case half 1 is rotated 180 degrees about its vertical axis. Upon mating, protruding press 4 will rupture a water pouch nestled in cylinders 12.

FIG. 1 shows one embodiment of inventive test kit 50 as how it is distributed to end users. Both case sections/halves 1 and 7 (they can each be more or less than one half of the housing) are mated together with the protruding press 4 facing outwards. The columns 8 (see FIG. 2) are designed to fasten to the holes 2. This allows the protruding press 4 to face outward and the water pouch support 12 surrounding water pouch 19 to be protected. The side grooves 3 and 6 on case half 1 are facing the same direction as the side grooves 9 and 13 of the half case 7; this helps indicate that the invention has not been used yet. FIG. 2 shows how the user initiates the test with half case 1 having been rotated 180 degrees about its vertical axis V. At this point, the user can begin the test by sprinkling powdered drug onto either hollow portion/indent 17 or indent 18; however, should the drug be in the form of a solid pill, the user can granulate the drug by grinding the pill along the edge of protruding press 4. Upon mating, protruding press 4 will rupture a frangible water pouch 19 nestled in water pouch support, e.g., cylinders 12. Half case 1 has an indent 17 which is one-half of a reservoir; the corresponding indent 18 is located in case half 7. Both indents will combine to form a reservoir; this reservoir will hold the water-drug mixture/solution.

Figure 3:
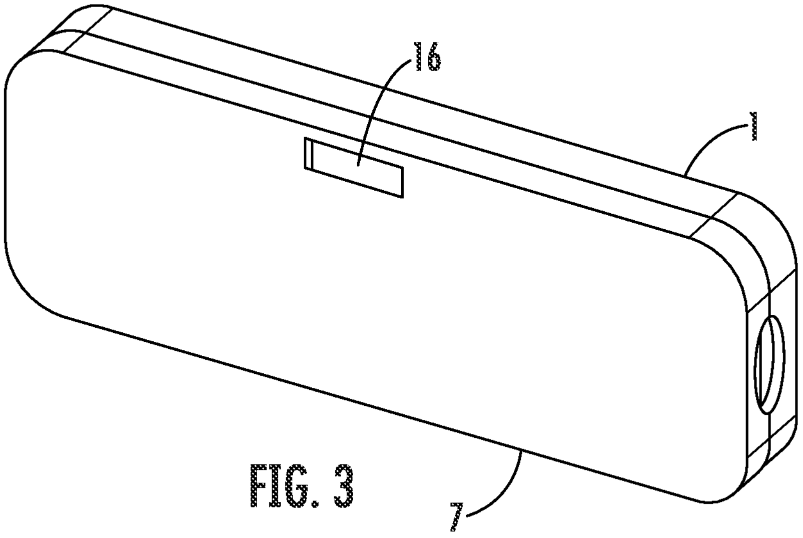
FIG. 3 is a perspective view of a test kit in accordance with an embodiment of the invention with the mated case halves after the test has been administered. The results of the fentanyl test strip can be read through a transparent opening 16 in case half 7.
Figure 4:
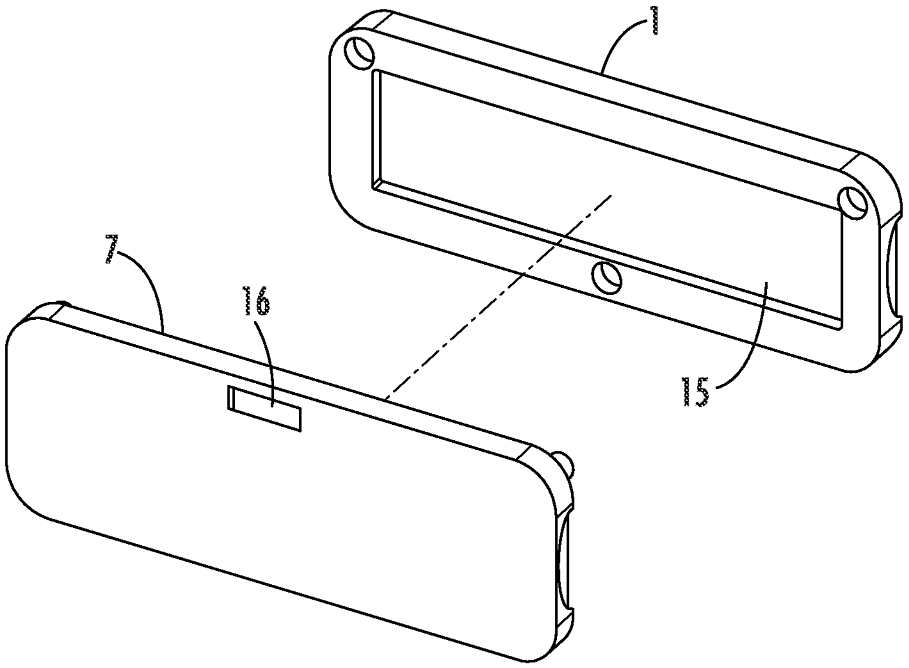
FIG. 4 is an exploded perspective view of FIG. 1 from the back side. The space 15 in half case 1 allows for the water pouch in half case 7 to reside securely in space 15 before the start of the test.

Immediately after closing the two cases, as shown in FIG. 3, the user holds kit 50 at the grooves 3, 6, 9, 13, and shakes to ensure that the water and drug mix together. The user should then orient the invention such that an outward indent 15 (see FIG. 4) faces up. A water-drug mixture will flow down a slide 10 to a chamber defined by the right side of wall 11. A sponge occupies this chamber to allow for a more controlled diffusion of the water-drug mixture. Water-drug mixture will come into contact with a test strip T (see FIGS. 8, 10) located in chamber 14. The test strip will be oriented in such a way that the part of the strip that must be in contact with liquid will be located on the side of the slide 10; this will allow the test strip to run immediately after the invention is shaken by the user. Returning to FIG. 4, the results of the test will be visible to the user through a window 16 which leads into chamber 14.

Figure 5:
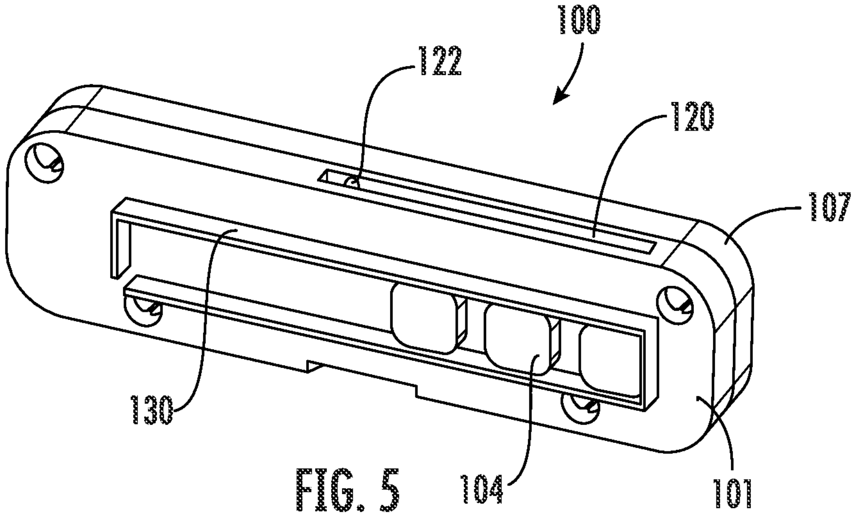
FIG. 5 is a perspective view of a test kit in accordance with a slightly modified embodiment of the invention configured how it is distributed to end users.
Figure 6:
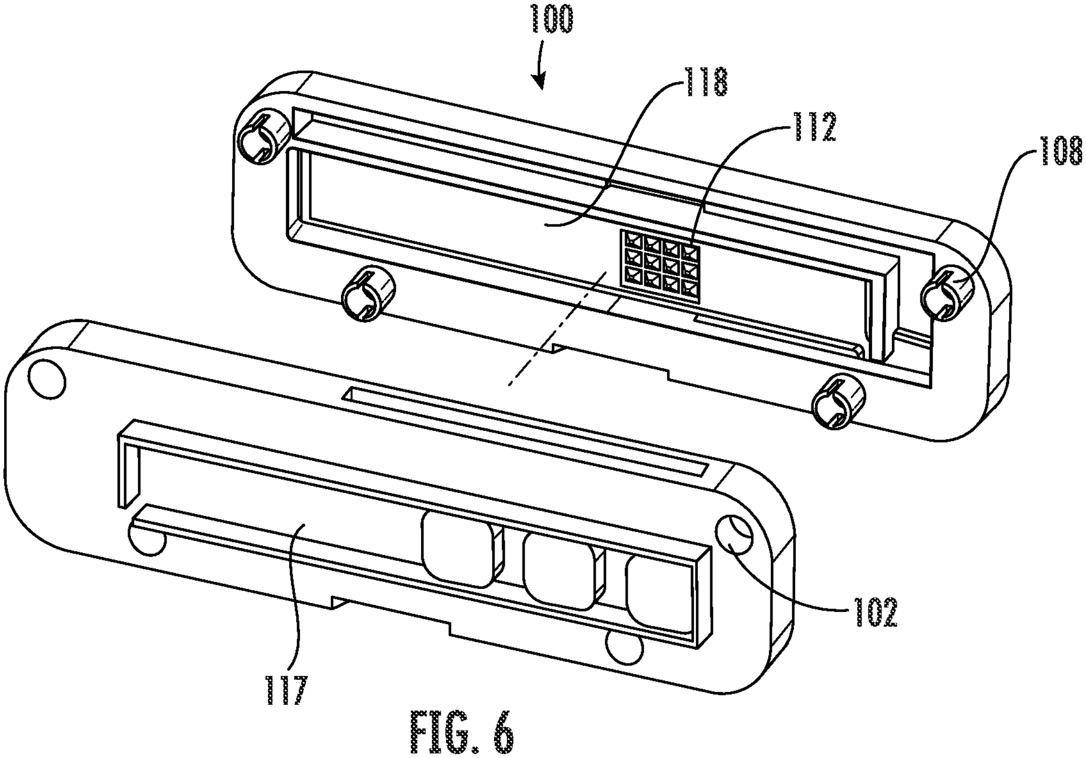
FIG. 6 is a perspective view of a test kit in accordance with the embodiment of the invention of FIG. 5 being configured for beginning the test with the user opening the two case halves.

A slightly modified embodiment of a test kit 100 is shown in FIGS. 5-12. FIG. 5 shows test kit 100 as how it is distributed to end users. Both case sections 101 and 107 are mated together with the protruding press 104 facing outwards. The columns 108 (see FIG. 6) are designed to fasten to the holes 102. This allows the protruding press 104 to face outward. Case section 101 includes slot 120 in which spoon 122 is removably provided. Spoon 122 is useful for taking a very small sample of the drug to be tested and enabling the user to avoid using their fingers or otherwise contacting the drug. A rubber seal 130 is provided to ensure a watertight seal around the reservoir formed by mating case sections 101 and 107. The user separates case sections 101 and 107 as shown in FIG. 6.

Figure 7:
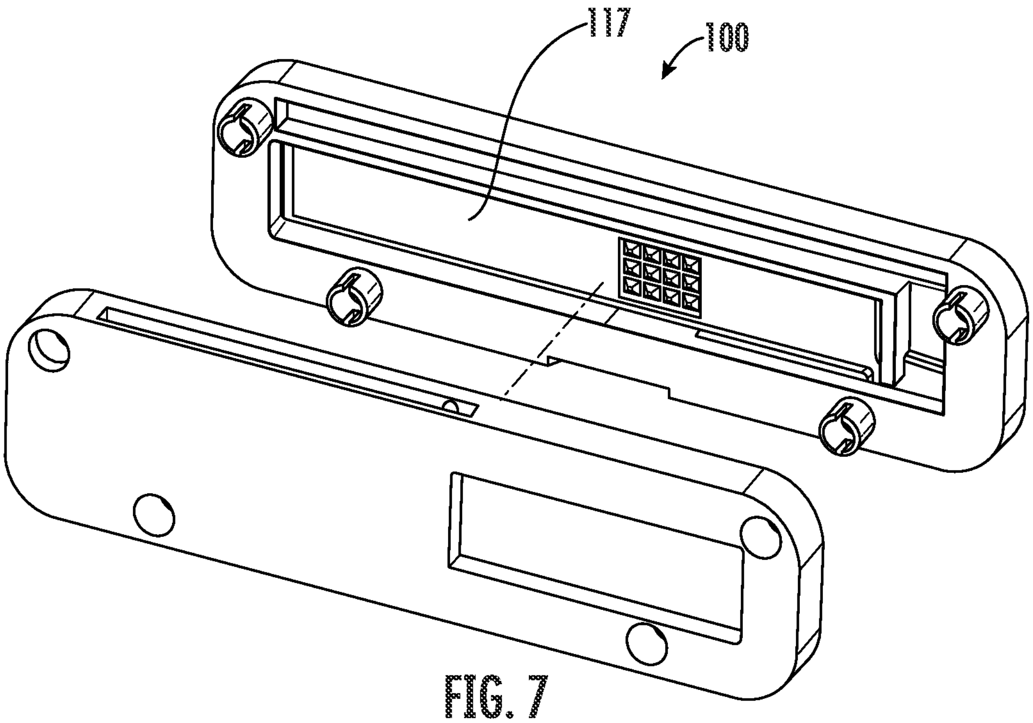
FIG. 7 is a perspective view that shows a test kit in accordance with the embodiment of the invention of FIG. 5 ready to perform a test.
Figure 8:
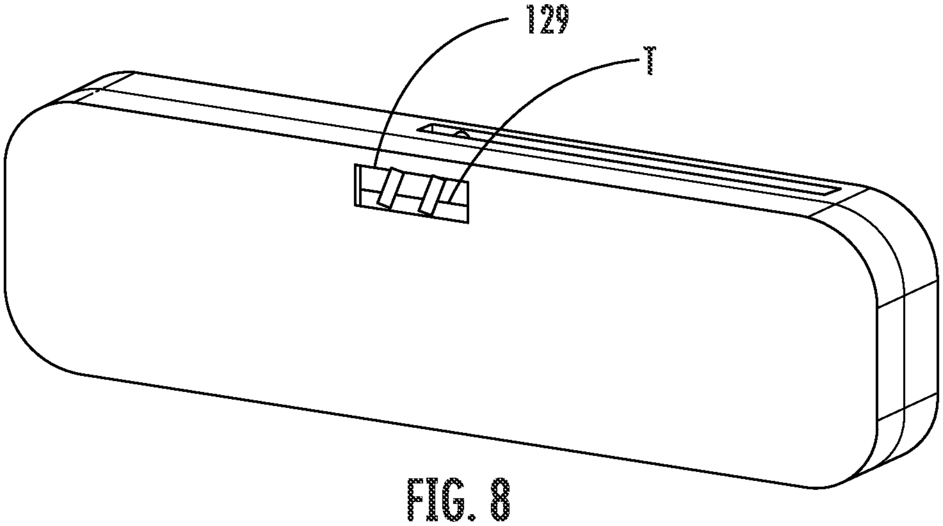
FIG. 8 is a rear perspective view of a test kit in accordance with the embodiment of the invention of FIG. 5 with the mated case halves after the test has been administered.
Figure 9:
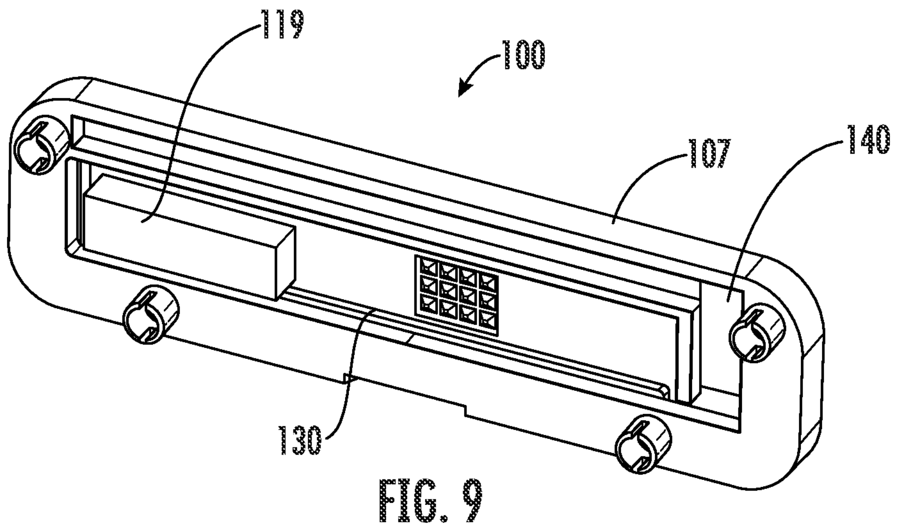
FIG. 9 is a perspective view of the main case portion of a test kit in accordance with the embodiment of the invention of FIG. 5.
Figure 10:
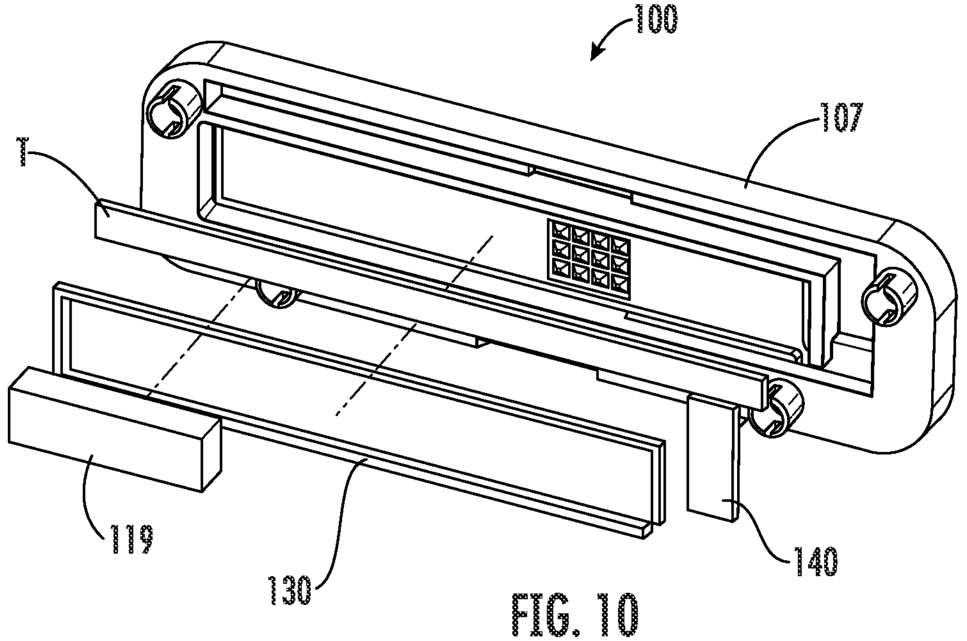
FIG. 10 is an exploded perspective view of FIG. 9.
Figure 11:
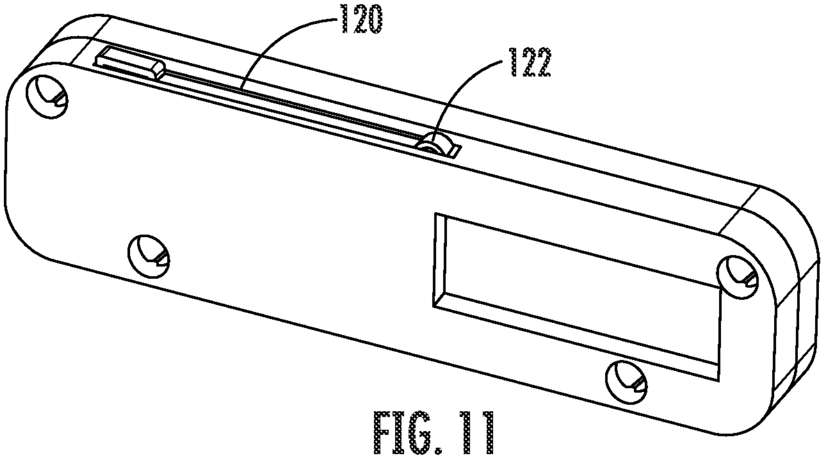
FIG. 11 is a rear perspective view of the embodiment of FIGS. 5-10.
Figure 12:
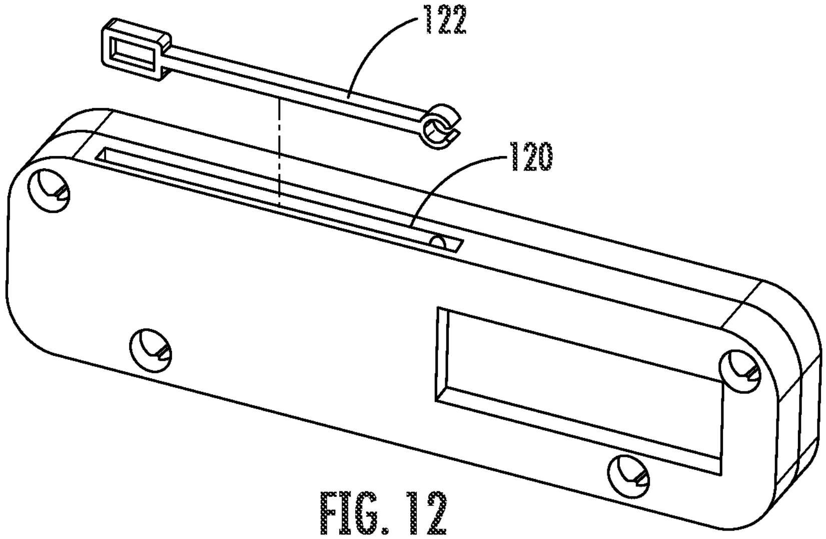
FIG. 12 is a partially exploded perspective view of FIG. 11.

FIG. 7 shows how the user initiates the test with case section 101 having been rotated 180 degrees about its vertical axis. At this point, the user can begin the test by sprinkling powdered drug onto either hollow portion/indent 117 or indent 118; however, should the drug be in the form of a solid pill, the user can granulate the drug by grinding the pill along the edge of abrasive section 112. Upon mating as shown in FIG. 8, protruding press 104 will rupture a frangible water pouch 119. Case section 101 has an indent 117 which is one-half of a reservoir; the corresponding indent 118 is located in case half 107. Both indents will combine to form a reservoir; this reservoir will hold the water-drug mixture/solution.

Test kit 100 is used in a similar manner to that of test kit 50 described above, with sponge 140 (FIGS. 9 and 10) controlling the flow of drug solution/mixture to test strip T. FIG. 8 depicts the rear of test kit 100 with test strip T visible through window 129.

Figure 13A:
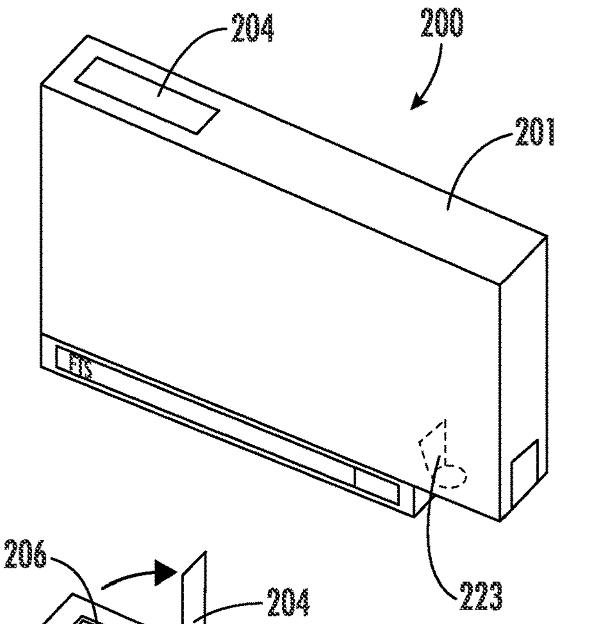
FIG. 13A is a perspective view of another embodiment of the invention in an initial configuration.
Figure 13B:
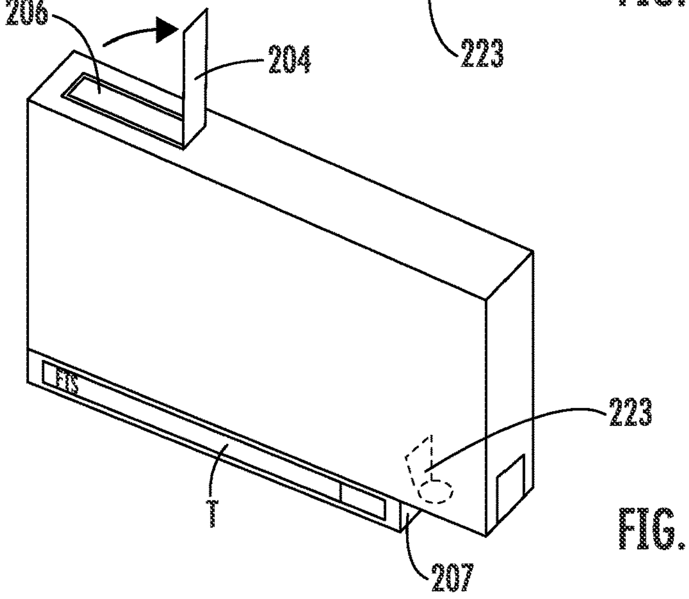
FIG. 13B is a perspective view of the embodiment of FIG. 13A with the top open.
Figure 13C:
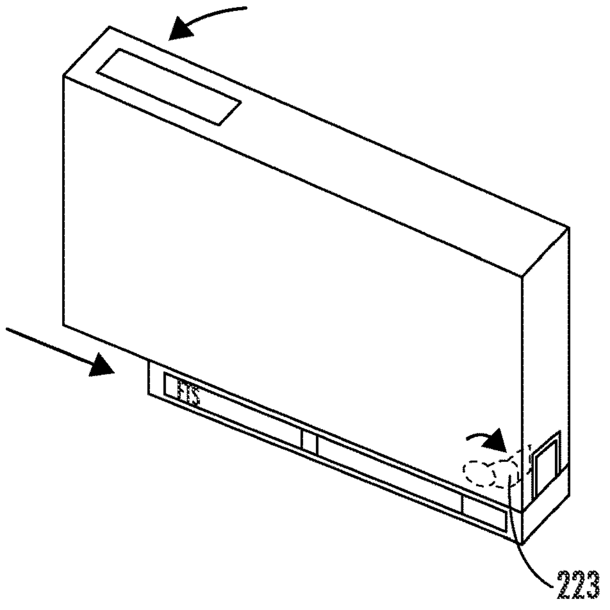
FIG. 13C is a perspective view of the embodiment of FIG. 13A in the test configuration.

Another embodiment of the invention is shown as test kit 200 in FIGS. 13A-C. Here, a track is connected to a test strip case 207 which slides under the water tank 201. This embodiment lacks the interlocking parts of the previous embodiment and instead includes a complete chamber with an internal water tank. Top flap 204 covers opening 206 through which drug samples are introduced (see FIG. 13B). Once the user has pushed the strip case entirely into its end position (see FIG. 13C), an internal seal 223 is ruptured, and the water-drug mixture comes into contact with the end of the strip that requires the water-drug mixture. Starting the test requires the user to push test strip case 207 along the track manually from the configuration of FIGS. 13A and B to that of FIG. 13C and thus will not trigger if the user shakes kit 200 prematurely.

Figure 14A:
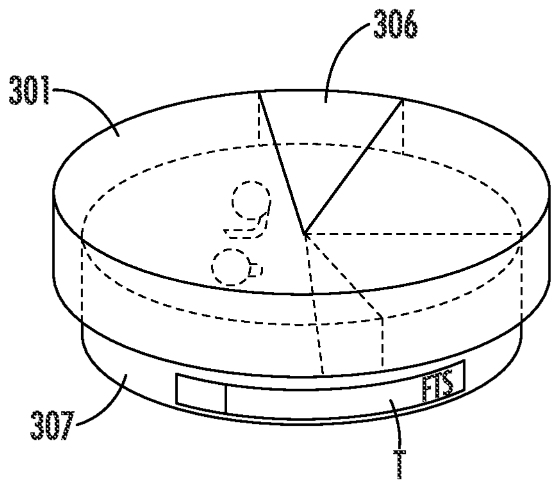
FIG. 14A is a perspective view of another embodiment of the invention in an initial configuration.
Figure 14B:
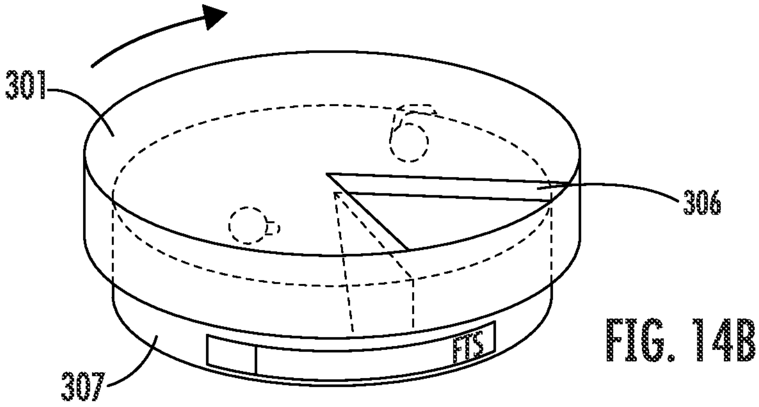
FIG. 14B is a perspective view of the embodiment of FIG. 14A in an intermediate configuration.
Figure 14C:
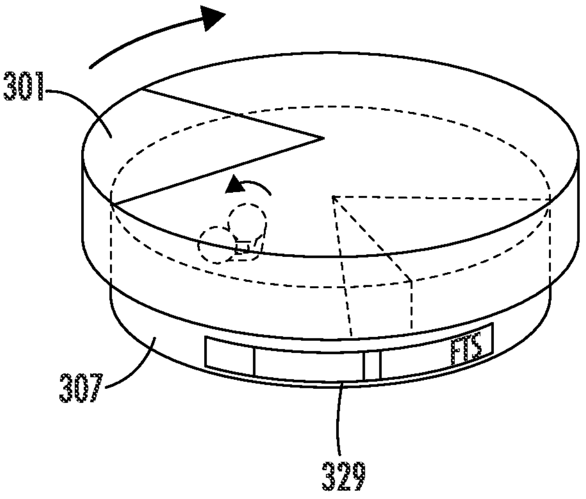
FIG. 14C is a perspective view of the embodiment of FIG. 14A in the test configuration.

Another embodiment of the invention is shown as test kit 300 in FIGS. 14A-C. Here, the shape of the device is substantially cylindrical rather than rectangular. (Of course, variations in shape, e.g., triangular, square, hexagonal, and any other shape are also contemplated as being within the scope of the invention.) The water tank is located on the top cylindrical section 301 and has a hatch 306 for inserting a powdered or liquid drug sample. In FIG. 14A, kit 300 is in the configuration as shipped to users, with hatch 306 not in communication with the interior of the device. The user then turns section 301 to align hatch 306 with a drug receptacle as shown in FIG. 14B. The user adds the drugs. The bottom cylindrical section 307 containing the test strip T remains stationary while the user further turns the water tank section 301 above until the apertures in both tanks line up as shown in FIG. 14C. Water will drip onto a test strip that is attached to the inside wall of the section 307, giving the strip a circular shape. Optionally, the cylindrical pieces are turned further to prevent the water from continuing to flow on the test strip. A window 329 on the side of the bottom cylindrical piece reveals the results of the screening and is covered by see-through plastic for the user's convenience.

The invention is not limited to the above description. For example, although in several embodiments the lateral flow test strip is moved with respect to the reservoir and/or frangible container, other embodiments are contemplated. For example, a portion of the housing may move instead, e.g., a watertight partition separating the reservoir from the test strip may be slidable from a first position in which it seals off the reservoir from the test strip to keep the test strip out of fluid communication with the reservoir to a second position in which the partition allows the test strip to be in fluid communication with the reservoir. Other variations are contemplated.

It should be understood that, in the context of this disclosure, "at least one of" followed by a series of elements means any one of the elements in the series or any combination of the elements in the series, including all of the elements. So, for example, a recitation of "at least one of A, B, or C" means any of A, B, C, A+B, A+C, B+C, or A+B+C.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A portable, self-contained drug test kit for testing for the presence or absence of a drug, comprising:

a first housing section having a first hollow portion;

a frangible container at least partially filled with a liquid solvent disposed in said first hollow portion;

a second housing section having a first side and a second side opposite said first side, said second housing section matingly engageable with said first housing section in a first configuration with said first side facing said first housing portion to form a pocket-sized portable housing comprising said first and second housing sections, said second housing section having:

a second hollow portion formed on said first side that corresponds to said first hollow portion when said second housing section is matingly engaged to said first housing section in said first configuration to form a reservoir; and a projection formed on said first side corresponding to and adapted to pierce said frangible container when said second housing section is matingly engaged to said first housing section in said first configuration; and a lateral flow test strip in communication with one of said first housing section or said second housing section, said lateral flow test strip having a reagent disposed thereon that reacts in the presence of the drug being tested for, said second housing section additionally being matingly engageable with said first housing section in a second configuration with said second side facing said first housing portion in which said second hollow portion does not correspond to said first hollow portion and in which said projection does not correspond with said frangible container and said projection does not pierce said frangible container, wherein when said second housing section is matingly engaged with said first housing section in said first configuration with a test solute disposed in one of said first housing portion or said second housing portion, said projection pierces said frangible container, releasing said liquid solvent to mix with the test solute and thereby activating said lateral flow test strip to test for the presence or absence of the drug in a self-contained manner.

2. A portable, self-contained drug test kit for testing for the presence or absence of a drug according to claim 1, wherein said lateral flow test strip is disposed at least partially in one of said first housing section or said second housing section, and said one of said first housing section or said second housing section in which said lateral flow test strip is disposed further comprises a window through which at least a portion of said lateral flow test strip on which said reagent is disposed can be seen from outside said drug test kit.

3. A portable, self-contained drug test kit for testing for the presence or absence of a drug according to claim 1, said drug test kit further comprising securing structure for securing said second housing section to said first housing section, said securing structure including male fasteners formed on at least one of said first housing section or said second housing section and female fasteners formed in at least the other of said first housing section or said second housing section, said female fasteners corresponding to said male fasteners in at least one of said first configuration or said second configuration.

4. A portable, self-contained drug test kit for testing for the presence or absence of a drug according to claim 3, wherein said male fasteners and said female fasteners are arranged in a symmetrical positioning so that said male fasteners engage said female fasteners in both said first configuration and said second configuration.

5. A portable, self-contained drug test kit for testing for the presence or absence of a drug according to claim 1, wherein said second housing section snap fits to said first housing section in said first configuration.

6. A portable, self-contained drug test kit for testing for the presence or absence of a drug according to claim 1, wherein said liquid solvent comprises water.

7. A portable, self-contained drug test kit for testing for the presence or absence of a drug according to claim 1, wherein said lateral flow test strip reagent is reactive at least to fentanyl.

8. A portable, self-contained method for testing for the presence or absence of a drug, comprising the steps of:

providing a pocket-sized portable housing having a hollow portion at least partially pre-filled with a liquid solvent, the hollow portion being accessible from outside the test kit to enable introduction of a test solute into the hollow portion;

providing a lateral flow test strip in user-selective fluid communication with the liquid solvent in the hollow portion, the lateral flow test strip having a reagent that reacts in the presence of the drug being tested for;

manually moving at least one of the lateral flow test strip or a portion of the housing from a first position in which the lateral flow test strip is not in fluid communication with the liquid solvent in the hollow portion to a second position in which the lateral flow test strip is in fluid communication with the liquid solvent in the hollow portion;

introducing the test solute into the hollow portion, wherein said introducing step causes the liquid solvent to mix with the test solute to form a test solution and thereby activate the lateral flow test strip when the at least one of the lateral flow test strip or the portion of the housing is in the second position, the pocket-sized portable housing having:

a first housing section having a first hollow portion;

a frangible container at least partially filled with the liquid solvent disposed in the first hollow portion;

a second housing section matingly engageable with the first housing section in a first configuration that places the lateral flow test strip into the second position, the second housing section having a second hollow portion that corresponds to the first hollow portion when the second housing section is matingly engaged to the first housing section in the first configuration to form a reservoir, and a projection corresponding to the frangible container when the second housing section is matingly engaged to the first housing section in the first configuration, wherein said moving step comprises the steps of:

matingly engaging the second housing section with the first housing section in the first configuration with a test solute disposed in one of the first housing portion or the second housing portion;

piercing the frangible container with the projection;

releasing the liquid solvent to mix with the test solute; and activating the lateral flow test strip to test for the presence or absence of the drug in a self-contained manner, further comprising the step of matingly engaging the second housing section with the first housing section in a second configuration in which the projection does not correspond with the frangible container and the projection does not pierce the frangible container, and the lateral flow test strip is in the first position.

* * * * *